United States Patent [19]

Vítovec et al.

[11] 4,080,182

[45] Mar. 21, 1978

[54] APPARATUS FOR CONDENSING VAPORS OF SUBLIMING SUBSTANCES

[75] Inventors: Jaroslav Vítovec; Vladimír Bažant; Ferdinand Lucek, all of Prague, Czechoslovakia

[73] Assignee: Ceskoslovenska akademie ved, Prague, Czechoslovakia

[21] Appl. No.: 723,074

[22] Filed: Sep. 14, 1976

Related U.S. Application Data

[63] Continuation-in-part of Ser. No. 585,503, Jun. 10, 1975, abandoned, which is a continuation-in-part of Ser. No. 273,833, Jul. 21, 1972, abandoned.

[30] Foreign Application Priority Data

Jul. 22, 1971 Czechoslovakia ............... 5399/71

[51] Int. Cl.² .............................................. B01D 13/00
[52] U.S. Cl. ........................................ 55/158; 55/269; 55/233; 55/240
[58] Field of Search ......... 55/82, 84, 85, 96, 233-234, 55/240, 269, 302, 158; 261/16, 17, DIG. 54; 62/82, 67

[56] References Cited

U.S. PATENT DOCUMENTS 3,472,891 10/1969 Ikeda et al. ..................... 55/82 X
3,961,665 6/1976 Langbroek et al. ........... 23/294 R X

*Primary Examiner*—Frank A. Spear, Jr.

[57] ABSTRACT

Apparatus for condensing vapors of subliming substances. The apparatus comprises a vessel having gas permeable porous walls spaced within a heated jacket, an inlet for supplying the gas mixture to be condensed into the interior of said vessel, an outlet for passing the non-condensed portion of said gas mixture together with solid condensate from said vessel, inlets into the space between the inner jacket wall and said vessel, means for supplying said space with a gas permeating through said gas permeable porous walls into said vessel, nozzles for injection of a liquid spray into the interior of said vessel, a filtering system, outlets for withdrawing non-condensed portion of said gas mixture, a receptacle for accumulating the solid condensate, and means for removing the solid condensate.

7 Claims, 1 Drawing Figure

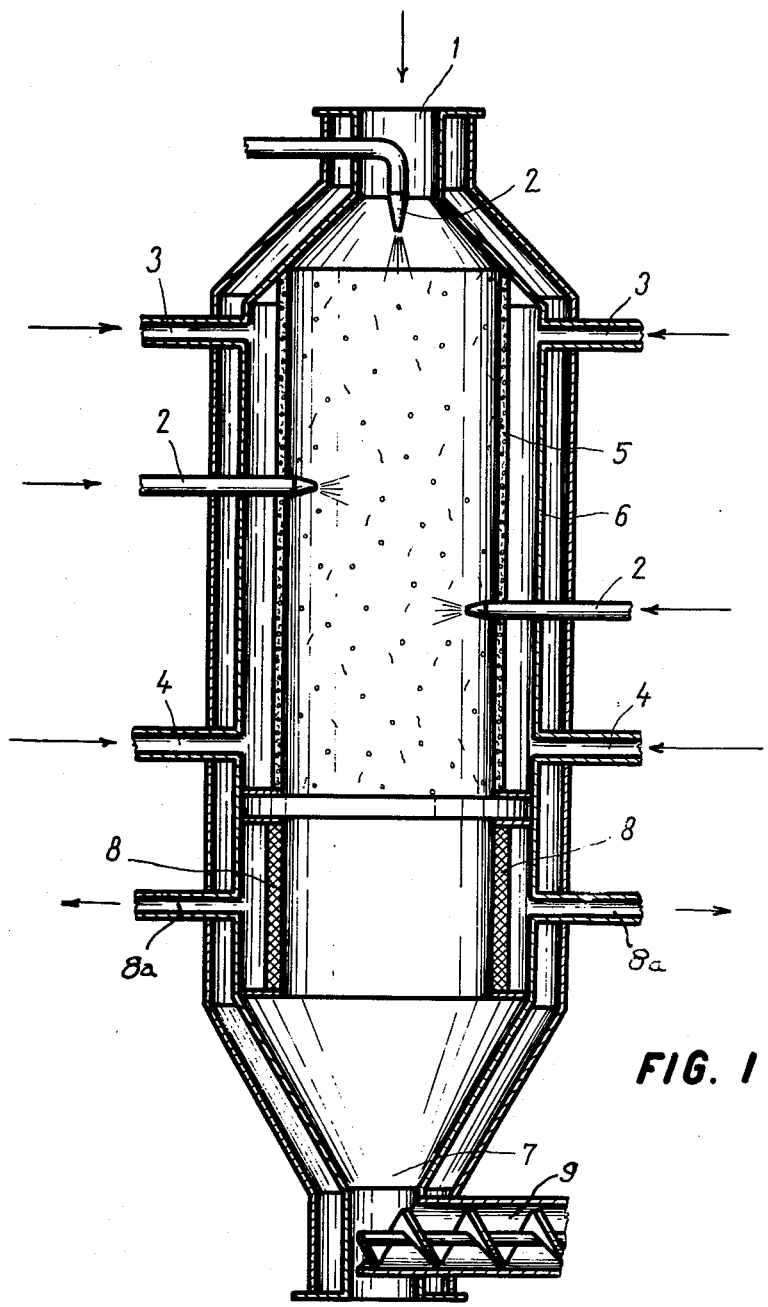
FIG. I

APPARATUS FOR CONDENSING VAPORS OF SUBLIMING SUBSTANCES

This application is a continuation-in-part of application Ser. No. 585,503 filed June 10, 1975, now abandoned; which is a continuation-in-part of application Ser. No. 273,833 filed July 21, 1972, now abandoned.

The present invention relates to an apparatus for condensing vapors of subliming substances.

Condensation of vapors of subliming substances from the gas phase is connected, as a rule, with considerable difficulties resulting from undesirable condensation of vapors of solid substances on the walls of the processing vessel. In an effort to overcome this problem, several apparatuses have been proposed to date. The earliest apparatuses consisted in removal of the deposit from the walls by mechanical means which, however, could lead to contamination of the products.

A recent apparatus used for this purpose has its walls heated to a temperature above the dew point of the processed gas mixture, whereby the solids are prevented from being deposited on the walls of the vessel (e.g. see German published Specification DAS No. 1,108,663, and U.S. Pat. No. 3,362,989); the costs of the operation, however, are considerably increased since the gas mixture has to be cooled to remove the heat acquired during contact with the hot wall.

According to another known apparatus (Czechoslovakian Pat. No. 161,505, which matured from Czechoslovakian Pat. No. PV 3251-70), the walls of the condenser are covered by a continuous liquid layer whereby a suspension of the subliming substances arises. The method is suitable in all the cases where the product is to be further processed in the form of a suspension. In other cases, the product has to be separated from the suspension and dried.

Still another apparatus is based on supplying a pure carrier gas or vapor along the walls of the condensing vessel co-currently with the gas mixture. The carrier is added repeatedly in several parts since the gas mixture is mixed with the carrier gas within a short portion of the vessel (see U.S. Pat. No. 3,526,658).

In order to eliminate the above-described drawbacks, an apparatus for condensing vapors of subliming substances is provided by this invention.

The apparatus according to the present invention comprises; a vessel, the peripheral gas permeable walls of which are situated coaxially of and spaced within a heated jacket; an inlet for supplying the gas mixture to be condensed in the interior of said vessel; an outlet for passing the non-condensed portion of the gas mixture together with condensed solids from the vessel; inlets into the space between the inner jacket wall and the vessel; means for supplying said space with a gas permeating through said gas permeable porous walls into said vessel; nozzles for injection of a finely dispersed liquid into the interior of the vessel; a filtering system for separation of the solid condensate from non-condensed portion of the gas mixture; outlets for withdrawing non-condensed gas mixture; a receptacle for accumulating the solid condensate provided in the bottom of the apparatus; and means for removing the solid condensate.

In the apparatus according to the present invention, a hot gas mixture containing the vapors of sublimable substances is supplied through the upper heated inlet into the interior of the vessel the peripheral walls of which are gas permeable where it is cooled by evaporation of the sprayed liquid injected through the nozzles into the gas mixture with the secondary gas permeated simultaneously into the vessel through its gas permeable walls which prevents the contact of the gaseous mixture with the interior surface of the gas-permeable walls of the vessel and thus protects the walls from solid deposits.

The vessel having gas permeable walls could be formed of gas permeable tubes or sheets made of various materials and commonly used for the separation of solids from gases. As their production could be expensive such vessels can be made simply of a wire basket supporting one or several layers of a gas permeable glass woven fabric which is commonly available.

Such gas permeable walls should have a corresponding resistance for the passage of a gas so that a uniform supply of the gas is arranged for on the whole area of the walls. The air permeability of such walls at the pressure drop of 1 Torr (about ½ in $H_2O$) should not exceed the value of 60 cubic meters per hour per square meter of the wall (about 3 cubic ft. per min. per sq ft.). Several layers of the fabric must be used, when the air permeability of one layer is higher than cited. The vessel is on both ends gastightly attached to the internal wall of the jacket 6.

The flow of the gaseous mixture in the direction of the vessel axis should not be turbulent so that the continously formed layer of the secondary gas on the internal surface of the gas permeable wall is not disturbed. Therefore the Reynolds number of the whole gas mixture containing the vapors of the subliming substances to be condensed together with the already permeated secondary gas passing in the direction of the vessel axis should not exceed 3000. In the given Examples the mean Reynolds numbers were 450 and 2500 for various gas flow rates of the secondary gas through the gas permeable wall of a vessel having a diameter 200 mm and the mean value of 2300 for a vessel having diameter of 100 mm. With an increasing vessel diameter the Reynolds number will increase, provided the velocity of the gaseous mixture in the direction of the vessel axis remains constant, but the necessary flow rate of the secondary gas will decrease.

Compared with an apparatus of the prior art, that of the invention allows a continous process with reduced running costs. This advantage is due to the fact that the temperature of the gas permeable porous walls of the condenser is substantially lower than the sublimation temperature. The product is obtained in a crystalline dry state without mechanical removal from the walls of the apparatus with a possibility of an easy separation of volatile impurities. Thus the risk of thermal decomposition of compounds as well as the heat losses of the process are substantially decreased.

In order that the invention may be better understood and carried into practise, a preferred embodiment thereof will hereinafter be described with reference to the single FIGURE of the accompanying drawing, which is not intended to limit the scope of the present invention in any way.

Turning now to the drawing it will be seen that the illustrative apparatus for condensing vapors of subliming substances comprises an upright vessel having gas permeable peripheral walls 5 situated coaxially of and spaced within a heated double-walled jacket 6. The vessel is formed of a wire basket inside which a layer of gas permeable glass woven fabric is fixed.

A hot gas mixture containing vapors of sublimable substances is supplied into the interior of the vessel 5 through an upper inlet 1 the walls of which are kept at a temperature above the dew point of the gas mixture. Co-currently with the hot gas mixture, finely dispersed volatile liquid, or water, are injected through nozzles 2 of which one is shown at a first level extending into the inlet 1, and two more are shown at different lower levels penetrating the gas permeable peripheral walls of the vertical vessel. Inlets 3 and 4, provided at different levels in the walls of the jacket 6 supply the space between the inner wall of the jacket 6 and the outer surface of the gas permeable walls 5 of the vessel with the secondary gas which penetrates through the gas permeable walls and prevents direct contact of the innser surface of vessel 5 by the cooled gas mixture. The space between the inner wall of jacket 6 and the outer surface of the gas permeable walls 5 of the vessel can be divided into vertically spaced sections in which different temperatures are maintained. The condensed solids fall into a conical receptacle 7 provided in the bottom of the apparatus; such solids are withdrawn by conventional means, such as, for instance, a worm conveyor 9 as shown, a vibratory conveyor, and the like. The non-condensed portion of the gas mixture passes through a filtering system 8 and outlets 8a arranged uniformly on the circumference of the lower part of the jacket 6.

Various gases or vapors can be used as the secondary gases or vapors, depending on the quality of the product required.

The temperature of the gas permeable walls 5 of the vessel is practically equal to that of the penetrating secondary gas.

The nozzles 2 are jacketed and the space between the nozzle and the jacket is flushed by the inert gas.

The apparatus has been tested by condensation of the vapors of ten compounds of various volatilities in mixture with nitrogen or air (benzoic acid, terephthalic acid, anthraquinone, hexachloroethane, naphtalene, pyrogallol, hydroquinone, salicylic acid, camphor).

Benzoic acid has the largest adhesion to cool surfaces of all substances cited. Therefore it was choosen for definition of conditions of the function of the apparatus with the gas permeable walls.

The minimum flow rate of the secondary gas permeating through the gas permeable walls 5 into the vessel was 2 cubic meter per hour per square meter of the wall. Greater increase in the flow rate increases the operating costs but the process considered is not affected.

The following Examples are given as illustrations only without, however, limiting the invention to the specific details thereof.

EXAMPLE I

A gas mixture containing 90 percent by volume of nitrogen and 10 percent by volume of benzoic acid under atmospheric pressure and a temperature of 200° C was supplied at the flow rate of 2 standard cubic meters per hour through the inlet 1 into the condenser shown schematically in the appended drawing and formed essentially by a cylindrical vessel having gas permeable walls 5 of 200 mm diameter and 1600 mm length placed in a heated double-walled jacket 6 of 220 mm inner diameter. The walls 5 of the vessel were formed of a wire basket inside which a layer of glass woven fabric was fixed. The air permeability of the fabric at the pressure drop of 1 Torr (Torricelli) was 60 cubic meters per hour per square meter. 400 grams per hour of water spray was supplied through an inlet nozzle 2. 2 standard cubic meters per hour of nitrogen at the temperature of 115° C were supplied through inlets 3 and 4. The gas mixture escaping the condenser through outlets 8a was at the temperature of 65° C and contained 0.10 percent by volume of benzoic acid. After twelve hours of operation, the inner walls 5 of the vessel were clean and the pressure difference of gases between both sides of the gas permeable walls 5 of the vessel, which was 0.1 Torr, remained unaltered during the experiment. The condensed product in the form of fine dry crystals was continuously removed from the receptacle 7 into a storage vessel where it was flushed by dry air at the rate of 1 cubic meter per hour for removal of residual, moist nitrogen.

EXAMPLE II

A gas mixture containing 98 percent by volume of air and 2 percent by volume of benzoic acid under atmospheric pressure and a temperature of 148° C was supplied at the flow rate of 16 standard cubic meters per hour through the inlet 1 into the same condenser as referred to in EXAMPLE I. 1200 grams per hour of water spray was supplied through inlet nozzles 2. Air at the rate of 6 standard cubic meters per hour at the temperature of 105° C was supplied through inlets 3 and 4. The gas mixture escaping the condenser through outlets 8a was at temperature 70° C and contained 0.2 percent by volume of benzoic acid. After 6 hours of operation, the inner walls 5 of the vessel were clean and the pressure difference of gases between both sides of the gas permeable walls 5 of the vessel, which was 0.2 Torr, remained unaltered during the experiment.

EXAMPLE III

A gas mixture containing 96 percent by volume of nitrogen and 4 percent by volume of salicylic acid under atmospheric pressure and a temperature of 168° C was supplied at the flow rate of 3 standard cubic meters per hour through the inlet 1 into the condenser as referred to in EXAMPLE I but the vessel with walls 5 having a diameter of 100 mm and 1000 mm length. Water spray at the rate of 400 grams per hour was supplied through inlet nozzle 2. One standard cubic meter per hour of nitrogen at the temperature of 125° C was supplied through inlets 3 and 4. The gas mixture escaping the condenser through outlets 8a was at a temperature of 70° C and contained 0.1 percent by volume of salicylic acid. After 6 hours of operation, the inner walls of the vessel 5 were clean and the pressure difference of gases between the both sides of the gas permeable porous walls of vessel 5, which was 0.15 Torr, remained unaltered during the experiment.

Although the invention is illustrated and described with reference to one preferred embodiment thereof, it is to be expressly understood that it is in no way limited to the disclosure of such a preferred embodiment but is capable of numerour modifications within the scope of the appended claims.

What is claimed is:

1. An apparatus for condensing vapors of subliming substances, comprising, in combination, a vessel having gas permeable porous walls, said vessel being axially disposed in a heated jacket having non-porous walls, said porous and non-porous walls defining an enclosed space therebetween, the vessel being provided with an inlet, for supplying the gas mixture to be condensed in the interior of said vessel, an outlet for passing the non-condensed portion of the gas mixture together with condensed solids from the vessel, at least two inlets into the enclosed space between the inner non-porous walls of the jacket and the gas permeable porous walls of said vessel, means for supplying said enclosed space with a secondary gas or vapor, the secondary gas or vapor permeating through said gas permeable porous walls into the interior space of the vessel inwardly of said porous walls, at least two nozzles passing through both the non-porous walls of the jacket and the gas permeable porous walls of the vessel and adapted for supplying a spray of water or volatile liquid into the interior of the vessel, filter means communicating the interior space of the vessel and the enclosed space, at least two outlets for withdrawing a non-condensed portion of said gas mixture through a said filter means, a bottom receptacle for collecting the solid condensate of said subliming substance, and means for removing the solid condensate therefrom.

2. An apparatus as claimed in claim 1, wherein the gas permeable porous walls of the vessel are made of a wire basket which supports a glass woven fabric.

3. An apparatus as claimed in claim 1, wherein the air permeability of the glass woven fabric at pressure drop of 1 Torr does not exceed the value of 60 cubic meters per hour per square meter of the fabric.

4. An apparatus as claimed in claim 1, wherein the flow of the secondary gas permeating the gas permeable porous walls is at least 2 cubic meters per hour per 1 square meter of said walls.

5. An apparatus as claimed in claim 1, wherein the pressure drop of the permeating secondary gas through the gas permeable porous walls is at least 0.1 Torr.

6. An apparatus as claimed in claim 1, wherein the Reynolds number of the gas mixture containing the vapors of the subliming substances to be condensed together with the secondary gas already permeated through the gas permeable walls and passing in the direction of the vessel axis does not exceed 2500.

7. The apparatus as set forth in claim 1, wherein said filter means are in the form of a cylinder which is coaxially arranged in said jacket below said vessel, and wherein said receptacle is in the form of a cone which forms a coaxial extension of said jacket and is arranged below said filter means.

* * * * *